United States Patent
Merical et al.

(10) Patent No.: US 8,110,260 B2
(45) Date of Patent: Feb. 7, 2012

(54) CONTAINERS INTENDED FOR MOISTURE-SENSITIVE PRODUCTS

(76) Inventors: Rick Merical, Appleton, WI (US); Kenneth C. Wurtzel, Bridgeton, NJ (US); Lee Murray, Appleton, WI (US)

(*) Notice: Subject to any disclaimer, the term of this patent is extended or adjusted under 35 U.S.C. 154(b) by 69 days.

(21) Appl. No.: 11/670,801

(22) Filed: Feb. 2, 2007

(65) Prior Publication Data

US 2008/0185301 A1 Aug. 7, 2008

(51) Int. Cl.
- *B32B 27/06* (2006.01)
- *B32B 27/18* (2006.01)
- *B32B 27/32* (2006.01)
- *B65D 81/26* (2006.01)

(52) U.S. Cl. ............... 428/35.7; 428/34.7; 428/36.4; 428/36.5; 206/204

(58) Field of Classification Search ........... 428/35.7, 428/35.8, 35.9, 458, 461, 469, 475.5, 476.1, 428/483, 515, 34.7, 36.4, 36.5; 206/204
See application file for complete search history.

(56) References Cited

U.S. PATENT DOCUMENTS

| | | |
|---|---|---|
| 2,987,174 A | 6/1961 | Free et al. |
| 3,063,767 A | 11/1962 | Heuer |
| 3,326,810 A | 6/1967 | Dolan et al. |
| 3,704,806 A | 12/1972 | Plachenov et al. |
| 3,804,663 A | 4/1974 | Clark |
| 3,809,223 A | 5/1974 | Kendall |
| 3,833,406 A | 9/1974 | White |
| 3,898,344 A | 8/1975 | Masuoka et al. |
| 3,914,174 A | 10/1975 | Fuchs |
| 4,036,360 A | 7/1977 | Deffeyes |
| 4,081,397 A | 3/1978 | Booe |
| 4,284,672 A | 8/1981 | Stillman |
| 4,391,855 A | 7/1983 | Geeck |
| 4,407,897 A | 10/1983 | Farrell et al. |
| 4,447,565 A | 5/1984 | Lula et al. |
| 4,464,443 A | 8/1984 | Farrell et al. |
| 4,485,204 A | 11/1984 | Nabors |
| 4,547,536 A | 10/1985 | Nabors |
| 4,646,914 A | 3/1987 | Gipson |
| 4,730,726 A | 3/1988 | Holzwarth |
| 4,770,944 A * | 9/1988 | Farrell et al. ............ 428/474.4 |

(Continued)

FOREIGN PATENT DOCUMENTS

EP 0 454 967 B1 12/1995

(Continued)

OTHER PUBLICATIONS

International Preliminary Report on Patentability in related International Patent Application No. PCT/US2007/066456, dated Jul. 31, 2008.

(Continued)

*Primary Examiner* — Walter B Aughenbaugh
(74) *Attorney, Agent, or Firm* — Harness, Dickey & Pierce, P.L.C.

(57) ABSTRACT

A container for a moisture-sensitive product. The container has an openable container body defining an interior volume for holding the product. More specifically, a rigid container defining an interior volume for holding a moisture-sensitive product, and comprising at least an inner layer and an outer layer, the inner and outer layers being coextruded layers, the inner layer comprising a polymeric material and a desiccant material, the outer layer comprising a moisture-barrier material.

18 Claims, 11 Drawing Sheets

U.S. PATENT DOCUMENTS

| | | |
|---|---|---|
| 4,861,632 A | 8/1989 | Caggiano |
| 4,929,482 A | 5/1990 | Moritani et al. |
| 4,960,639 A | 10/1990 | Oda et al. |
| 4,999,229 A | 3/1991 | Moritani et al. |
| 5,078,909 A | 1/1992 | Shigeta et al. |
| 5,153,038 A | 10/1992 | Koyama |
| 5,246,753 A | 9/1993 | Koyama et al. |
| 5,322,161 A | 6/1994 | Shichman et al. |
| 5,378,428 A | 1/1995 | Inoue et al. |
| 5,393,457 A | 2/1995 | Miksic et al. |
| 5,399,609 A | 3/1995 | Moss |
| 5,431,970 A | 7/1995 | Broun et al. |
| 5,500,041 A | 3/1996 | Debuigne |
| 5,529,177 A | 6/1996 | Podd et al. |
| 5,633,054 A | 5/1997 | Hollinger, Jr. |
| 5,686,161 A | 11/1997 | Cullen et al. |
| 6,103,141 A | 8/2000 | Incorvia et al. |
| 6,112,888 A | 9/2000 | Sauro et al. |
| 6,124,006 A * | 9/2000 | Hekal ............... 428/34.1 |
| 6,135,273 A | 10/2000 | Cuen |
| 6,214,426 B1 | 4/2001 | Kawachi et al. |
| 6,279,736 B1 | 8/2001 | Hekal |
| 6,451,423 B1 | 9/2002 | Armat et al. |
| 6,531,197 B2 | 3/2003 | Neteler |
| 6,534,571 B1 | 3/2003 | Hoover |
| 6,562,452 B2 | 5/2003 | Ferri |
| 6,991,095 B1 | 1/2006 | Yamasoto et al. |
| 7,312,569 B2 | 12/2007 | Kim et al. |
| 7,413,083 B2 | 8/2008 | Belfance et al. |
| 2002/0006483 A1* | 1/2002 | Neteler ............... 428/35.2 |
| 2002/0048552 A1 | 4/2002 | Garrill et al. |
| 2002/0073530 A1 | 6/2002 | Ferri |
| 2002/0090473 A1 | 7/2002 | Lee et al. |
| 2003/0235664 A1* | 12/2003 | Merical et al. ........ 428/35.7 |
| 2004/0023585 A1 | 2/2004 | Carroll et al. |
| 2004/0170780 A1 | 9/2004 | Giraud |
| 2005/0140041 A1 | 6/2005 | Seth |
| 2005/0140285 A1 | 6/2005 | Park et al. |
| 2005/0255139 A1 | 11/2005 | Hurd et al. |
| 2006/0077146 A1 | 4/2006 | Palmateer |
| 2006/0138928 A1 | 6/2006 | Kim et al. |
| 2006/0201620 A1 | 9/2006 | Seo |
| 2006/0236868 A1 | 10/2006 | Pansegrouw |
| 2006/0258783 A1 | 11/2006 | Rettenbacher |
| 2007/0084735 A1 | 4/2007 | Lancesseur et al. |
| 2007/0135548 A1 | 6/2007 | Seth |
| 2007/0269401 A1 | 11/2007 | Portier |
| 2009/0022434 A1 | 1/2009 | Chiba et al. |
| 2009/0071855 A1 | 3/2009 | Bahuguna et al. |
| 2009/0223983 A1 | 9/2009 | Leary |

FOREIGN PATENT DOCUMENTS

| | | |
|---|---|---|
| EP | 0 831 033 A | 3/1998 |
| EP | 0 879 772 B1 | 6/2002 |
| EP | 1 733 872 A | 12/2006 |
| GB | 1 069 929 A | 5/1967 |
| WO | 2004/080808 A | 9/2004 |
| WO | 2006/115264 A | 11/2006 |

OTHER PUBLICATIONS

Supplementary European Search Report in related European Patent Application No. 03 76 1128, dated Jul. 3, 2008.
International Search Report in related International Patent Application No. PCT/US2008/052767, dated Jun. 19, 2008.
Rosato, et al., "Injection Molding Handbook," Third Edition, 2000, Bibliographic Information, pp. iii-xxvii.
Rosato, et al., "Injection Molding Handbook," Third Edition, 2000, Chapter 1, pp. 1-27.
Rosato, et al., "Injection Molding Handbook," Third Edition, 2000, Chapter 4, pp. 221-414.
Rosato, et al., "Injection Molding Handbook," Third Edition, 2000, Chapter 5, pp. 415-478.
Rosato, et al., "Injection Molding Handbook," Third Edition, 2000, Chapter 6, pp. 479-622.
Rosato, et al., "Injection Molding Handbook," Third Edition, 2000, Chapter 12, pp. 1028-1126.
Rosato, et al., "Injection Molding Handbook," Third Edition, 2000, Chapter 15, pp. 1197-1269.
Lee, "Plastic Blow Molding Handbook," 1990, Bibliographic Information, pp. iii-ix.
Lee, "Plastic Blow Molding Handbook," 1990, Chapter 1, pp. 1-19.
Lee, "Plastic Blow Molding Handbook," 1990, Chapter 4, pp. 83-114.
Lee, "Plastic Blow Molding Handbook," 1990, Chapter 16, pp. 359-383.
Lee, "Plastic Blow Molding Handbook," 1990, Chapter 21, pp. 433-474.

* cited by examiner

CONTAINERS INTENDED FOR MOISTURE-SENSITIVE PRODUCTS

FIELD OF THE INVENTION

This disclosure relates to the packaging of products that are sensitive to moisture, such as medicines or consumer goods produced in powder, pill, tablet, capsule, pastille, granule, gelcap or other forms, and which can become damaged or deteriorated if exposed to moist air over time. More particularly, the present disclosure relates to rigid containers used for packaging such products, particularly re-closable containers, and to methods for production of such containers.

BACKGROUND OF THE INVENTION

Many medicaments and other ingestible or non-ingestible consumer products are adversely affected if exposed to moisture or moist air for a period of time and must be protected against such exposure between production and consumption. The damage may take the form of moisture absorption that changes the physical properties of the products (e.g. making pills or particles of powder clump together) or even chemical change or corrosion. When such products are produced and sold in small amounts and in discrete unit form (e.g. pills or tablets), they are often sealed in re-closable containers made of glass or plastics, such as conventional pill or tablet bottles, to which a desiccant, in the form of a sachet or packet, is added to remove any moisture from the enclosed atmosphere.

A conventional desiccant sachet is inserted into the container with the product itself. The desiccant sachet is important because it acts to remove any moisture that may permeate into the container during storage or transportation and also acts to remove moisture that may have entered the container when a consumer opens or closes the container. Because the desiccant sachet is free floating within the container, there is therefore a risk that the sachet or packet or canister may be removed once the container has been opened but before the product has been completely used up, thereby placing remaining product at risk of moisture damage. Also, there is a risk that the sachet may rupture or be accidentally consumed along with the product itself, thus creating a hazard for the user. It is also to be noted that the production and insertion of such sachet or packet or canister adds an undesired cost to the production of the product. In addition, there is a risk that the inserting equipment will miss inserting the sachet, packet or canister into the container, thereby leaving the consumable product unprotected and subject to premature loss of efficacy.

BRIEF SUMMARY OF THE INVENTION

According to the present disclosure, there is provided a container for a moisture-sensitive product, comprising: a container body defining an interior volume for holding a moisture-sensitive product, wherein the container body is made of a rigid material comprising at least two co-extruded polymer layers, i.e., an inner one comprising a desiccant, and an outer layer comprising a solid, non-porous moisture-barrier material.

Following the present disclosure, it is possible to create a container in which there is an inner layer having a desiccant moisture scavenger in intimate contact or near intimate contact with any moisture within the interior volume of the container. Following the present disclosure, the desiccant is protected from abrasion that would lead to mixing of the desiccant with the contents of the container. The container may nevertheless have the desired strength and rigidity required for transportation and storage of the contained product.

Also described herein are methods for producing containers for a moisture sensitive product.

BRIEF DESCRIPTION OF THE DRAWINGS

Non-limiting embodiments will now be described with reference to the accompanying drawings.

DETAILED DESCRIPTION OF EMBODIMENTS

The containers and methods disclosed herein advantageously can allow the manufacturer of these containers to limit the risks and hazards posed by most commonly used forms of desiccants used today, and can allow containers to be made more efficiently and cost effectively. The desiccant in the containers disclosed herein cannot be readily removed from the containers by consumers. This in turn allows for the product within the container to be continually protected from moisture and prevents consumers from accidentally ingesting the desiccant material. The containers and methods disclosed herein can eliminate the steps of making a separate desiccant containing liner, sachet, packet or canister and then inserting the separate desiccant containing liner, sachet, packet or canister into containers.

In coextrusion or coinjection methods disclosed herein, a manufacturer can mass produce a container comprising a layer comprising a desiccant material, wherein the layer comprising the desiccant material can be the inner layer of the container in intimate or near intimate contact with moisture sensitive product to be held within the container, or the desiccant layer can be encapsulated near the interior with a protective layer of breathable polymer. In the coextrusion or coinjection methods disclosed herein, a manufacturer can simply coextrude or coinject materials into a mold that corresponds to the container to be formed. In the coextrusion or coinjection methods disclosed herein, a manufacturer can readily switch to making a different sized container by simply using a different mold corresponding to the different sized container, and coextruding or coinjecting the same materials into that subsequently used mold. Methods of production and process included can be coextrusion blow molding, coinjection molding, coinjection blow molding, and/or coinjection stretch blow molding.

Where a layer comprising desiccant is coextruded or coinjected with at least an outer layer of the container, the coextrusion and coinjection methods disclosed herein can eliminate the risk of failing to insert a separate desiccant containing liner into containers and the quality control measures associated with that risk.

Figure 1:
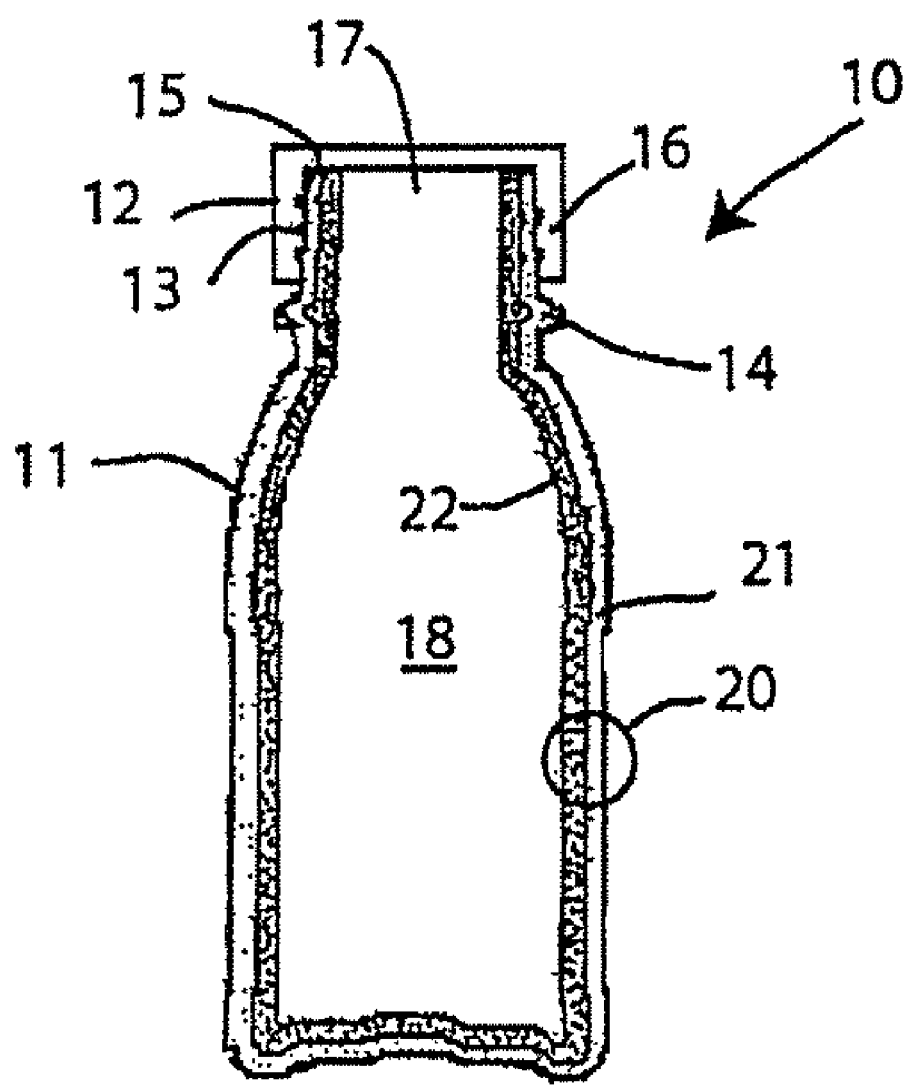
FIG. 1 is a vertical cross-section of a container according to one embodiment of the present invention.

An example of a container 11 for moisture sensitive products is shown in FIG. 1 of the accompanying drawings. Container 11 is in the form of a plastic bottle. While a bottle is shown in FIG. 1, those skilled in the art will recognize that a wide variety of containers can be made in accordance with disclosures herein, including but not limited to bottles, canisters (e.g., canisters for 35 mm film), vials (e.g., vials for pharmaceutical products), etc. A cross-sectional area defined by a neck of the container can be smaller, larger or the same size as a cross-sectional area defined by the side wall of the container. Container 11 and a closure or lid 12 form a container and lid combination 10. Lid 12 in some embodiments can attach to the container 11 via a screw thread 13 formed on a neck 14 of container 11 that engages with a corresponding thread on an inner surface 15 of a skirt 16 of the lid 12. Container 11 defines an internal volume 18 that encloses the product (not shown) in the completed form of the package. In alternative forms, container 11 can have a different shape or appearance from that shown in FIG. 1. If desired, container and lid combination 10 may be provided in the conventional way with an anti-tamper feature. Such a feature would, of course, have to be removed before the contents could be accessed.

Container 11 can be a rigid, semi-rigid, or flexible container made of multiple layers of plastic resin(s) 20. In one embodiment, the multiple layers of plastic resin(s) can be such that when formed into a container, the container retains its molded shape under gravity (when empty or when filled with product) but, if desired, may be flexible enough to be indented when squeezed by hand. Even when indented by hand, the material can return to its original shape when released, even when the container is open. In one embodiment, the side wall of the container can have a thickness of about 15 mils or greater. In a further embodiment, the side wall of the container can have a thickness of about 15 to 110 mils. In a further embodiment, the side wall of the container can have a thickness of about 103 mils, with an outer layer 21 of the side wall being about 30 mils thick and an inner layer 22 of the side wall being about 73 mils thick. In one embodiment, the density of the side wall can be around 0.888 grams/cc or greater.

Container 11 may preferably be formed by a process called coextrusion or coinjection. Specifically, different layers of material comprising container 11 can be coextruded in a multilayer coextrusion blow molding process, coinjection molding, co-injection blow molding, and/or co-injection stretch blow molding. Other extrusion processes can be used, such as cast and tubular water quench extrusion processes.

While the following discussion focuses on formation of container 11, the same discussion can apply equally to formation of closure or lid 12.

Container 11 may be made of at least two different coextruded layers 21 and 22 of plastic material. Specifically, layers 21 and 22 may be coextruded as a hot molten tube containing the multiple layers 20 of plastic material. Container 11 can then be made from the tube by conventional blow-molding techniques. The layers 21 and 22 may also be co-injection molded into a finished container or that co-injection item, while still hot, may be blow molded into a finished container, dependent upon the desired container shape, using co-injection blow molding or co-injection stretch blow molding techniques.

In one embodiment, polymers for the different layers are extruded separately and then brought together in a die, which co-extrudes them as a multilayer tube. During the manufacturing process, this tube can be located in a mold having cavity portions cut into it which together define the shape of container 11. The cavity portions can be closed onto the multilayer tube by pinching the tube at the top and the bottom to form a sealed tube. The tube can be pierced at the top and air can be injected to inflate the multilayer tube to fit the shape of the cavity of the mold. The mold can be opened and the multilayered container can be removed. The container can be trimmed of flash at the bottom and top where the multilayer tube was pinched shut.

Layer 21, the outer layer of container 11, can be made of any conventional thermoplastic resin material used for containers of this kind. In one embodiment, layer 21 comprises high density polyethylene (HDPE) (e.g., polyethylene having a density of about 0.95 to 0.96 g/cc and having chains which are virtually linear, that is, virtually no side chain branching), but other extrudable resins may be used, such as cyclic olefin copolymers, polypropylene, other polyethylenes, nylon and polyesters. The resin comprising layer 21 should have a high resistance to penetration by moisture when present in the shaped container. In one embodiment, layer 21 should preferably act as a barrier layer to substantially block the penetration of moisture. This may be assured both by choosing an appropriate resin and also by providing the layer with a suitable thickness.

Layer 22, the inner layer of container 11, can comprise a desiccant blended within a resin. Layer 22 should be minimally exposed to any ambient moist air before, during and after extrusion and blow molding as the desiccant is susceptible to moisture take-up during processing. The formulation of the resin for layer 22 should be such that it can be extruded in a manner that allows adhesion to an adjoining layer of the container, as well as providing appropriate rheology during melting, processing and forming. The nature of the resin and the amount used is preferably such that, in the final container, the resin in layer 22 is permeable to water vapor and moisture so that the desiccant in layer 22 may act to keep the interior of the container dry. By having a desiccant in layer 22, a foil seal, such as a foil induction seal, can be used to provide a seal after product is placed within the open space defined by the container. This decreases or eliminates the need to have a desiccant sachet or desiccant insert placed within the container, and reduces or eliminates the need for a desiccant placed in the lid or cap in order to protect product placed in the container from being adversely effected by moisture.

The above described construction can provide enhanced package integrity by reducing or eliminating the need to align and register a sachet into a finished package, and can reduce or eliminate the need to slow line filling speed for sachet and/or insert placement within a container, and can reduce the possibility of contamination, such as dust, from entering the container. The above described construction can provide lower headspace relative humidity (RH) because the desiccant in layer 22 never leaves the container and is always exposed to product placed within the container and/or the open space defined by the container.

The starting material for layer 22 may also contain a small proportion of a foaming or blowing agent, e.g. a heat-sensitive blowing agent that commences "foaming" of the resin at the time it exits the extruder. Specifically, in those cases where the layer 22 is intended to be provided with open pores in the resin that allow better contact of the desiccant in the layer with the atmosphere within the enclosed volume 18, a blowing agent is incorporated into the resin mixture intended to form the inner layer 22. Because layer 22 has numerous pores as a result of the foaming of the blowing agent, the desiccant material has a greater surface area exposure to the container's open space, including headspace between product placed within the container and the lid of the container, thereby enabling a faster acting desiccant layer as compared to those layers which have not been exposed to a blowing agent. A blowing agent can be selected that is heat-activated at a temperature suitable for the resin co-extrusion step so that the blowing agent forms a gas as the resin mixture is extruded through the die slot. Thus, as layer 22 is formed, the gas can create pores in the resin and the pores can remain in the resin as layer 22 contacts and adheres to layer 21 to form a multiple layer tube which is later molded into container 11. The amount of blowing agent employed in the resin mixture should be appropriate to produce an open-pore structure in container 11 without disintegrating or weakening the resin matrix of layer 22. Normally, the minimum amount of blowing agent that can achieve the desired porosity is employed. This amount depends on the actual blowing agent employed.

Suitable blowing agents for this purpose may be physical or chemical blowing agents. Physical blowing agents undergo only physical change. The most common are low-boiling organic liquids, such as hydrocarbons (normal pentane, iso-pentane and cyclo pentane) and halogenated hydrocarbons, which develop cells within the plastic material by changing from liquid to gas during foaming under the influence of heat. Gases (e.g. nitrogen gas) constitute another group of substances belonging to this class. When physical blowing agents are used in foaming, therefore, the gas phase of the foam is chemically identical with the blowing agent. Chemical blowing agents are materials that are stable at normal storage temperature and under specific processing conditions, but undergo decomposition with controllable gas evolution at reasonably well defined temperatures (or reaction conditions). When they are used in foaming, the gas phase of the resulting foam is different from the blowing agent (usually a solid substance). Blowing agents of this class can be organic nitrogen compounds (e.g., azodicarbonamide), and produce, mainly, nitrogen gas along with smaller proportions of other gases.

The resulting layer 22 can be porous and allow greater contact between moisture and the desiccant in the formed layer 22. The type of blowing agent and its concentration in the resin may affect the number of pores formed in the final layer 22 and the size of the pores, so suitable choices can be made to produce a product of the required specifications. The resin used for this layer may be different from the resin used for layer 21, but it may be the same, e.g. a high density polyethylene.

The desiccant blended into the resin or polymeric material used for layer 22 could be a powdered solid that is mixed with the molten resin before co-extrusion takes place. The amount of desiccant can be sufficient to provide the required drying action in the interior volume 18 of the finished container 10. The ratio of desiccant to resin can be the highest amount that can run successfully in the extrusion and blow molding equipment. The ratio may often range from 5 parts by weight of desiccant to 95 parts by weight of resin, to 80 parts by weight of desiccant to 20 parts by weight of resin. In one embodiment, the ratio can be approximately 10 to 25 parts by weight desiccant to approximately 75 to 90 parts by weight resin. In a particular embodiment, the ratio can be about 50:50 by weight. In one embodiment, the desiccant material can be a Calcium Oxide (CaO) desiccant concentrate.

The combined thicknesses of the two layers 21 and 22 can provide the container with the required rigidity and durability to meet commercial performance requirements. Specifically, when the resin employed in the layers is high density polyethylene, the outer layer 21 can have a thickness in the range of about 20 to 50 mils, and in a more particular embodiment about 30 mils, and the inner layer 22 can have a thickness in the range of about 10 to 25 mils, and in a more particular embodiment about 15 mils. The total thickness of the combined multiple layers 20 may be, for example, 45 mils. The total thickness can be less than or greater than embodiments above.

Closure or lid 12 may be a conventional closure or lid, e.g. a lid made of injection-molded high density polyethylene. In one embodiment, there would be no desiccant in the lid. In another embodiment, the lid 12 can contain a desiccant and can be made of the same or similar double-layer structure as the container body 11, if desired. The closure can be of any suitable thickness.

Figure 8:
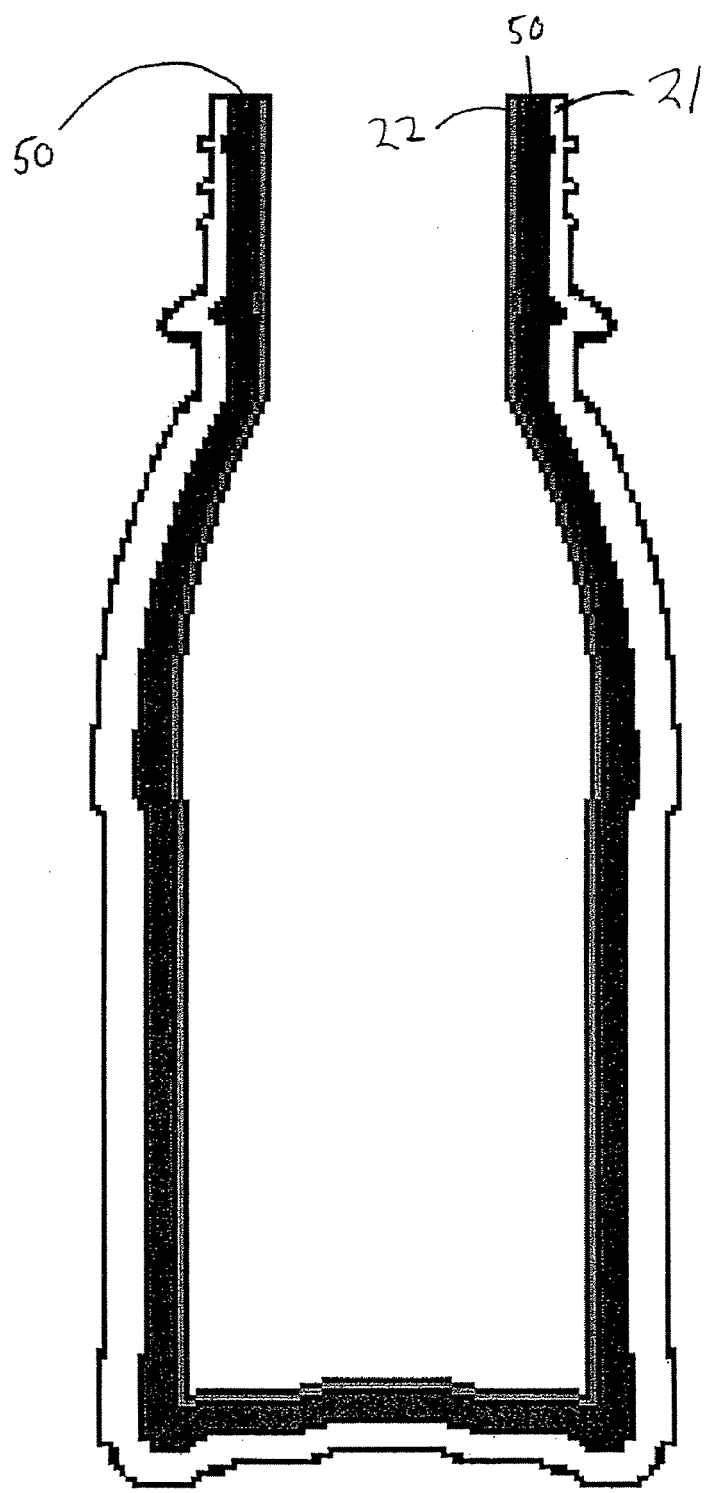
FIG. 8 is a vertical cross-section of a container according to another embodiment of the present invention.

In another embodiment it is also possible to use three or more co-extruded layers to form the container 11. For example, inner layer 22 and outer layer 21 discussed above may be separated by a thin co-extruded intermediate layer 50 with a very high resistance to penetration by moisture. See FIG. 8. This further reduces moisture ingress into the container and thus extends the useful life of the desiccant and therefore the shelf life of the packaged product. While FIG. 8 shows intermediate layer 50 being thicker than inner layer 22, intermediate layer 50 can have the same thickness as inner layer 22, or be thinner than inner layer 22. In an embodiment, a suitable material for the intermediate layer can be, for example, a fluoropolymer resin sold by Honeywell under the trademark Aclon, or polychlorotrifluoroethylene (PCTFE) sold under the trademark Aclon. Intermediate layer 50 can comprise a material having a higher moisture resistance or a lower moisture resistance than the moisture-barrier material in the outer layer.

Figure 6:
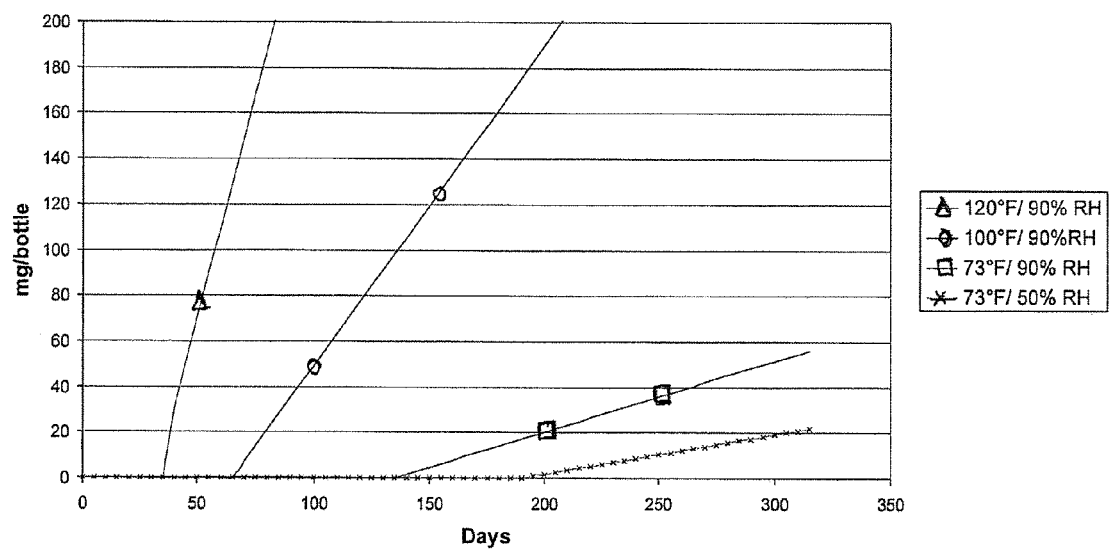
FIG. 6 is a graph illustrating projected product moisture gain for a CaO desiccant container of one embodiment of the kind shown in FIG. 1.
Figure 9:
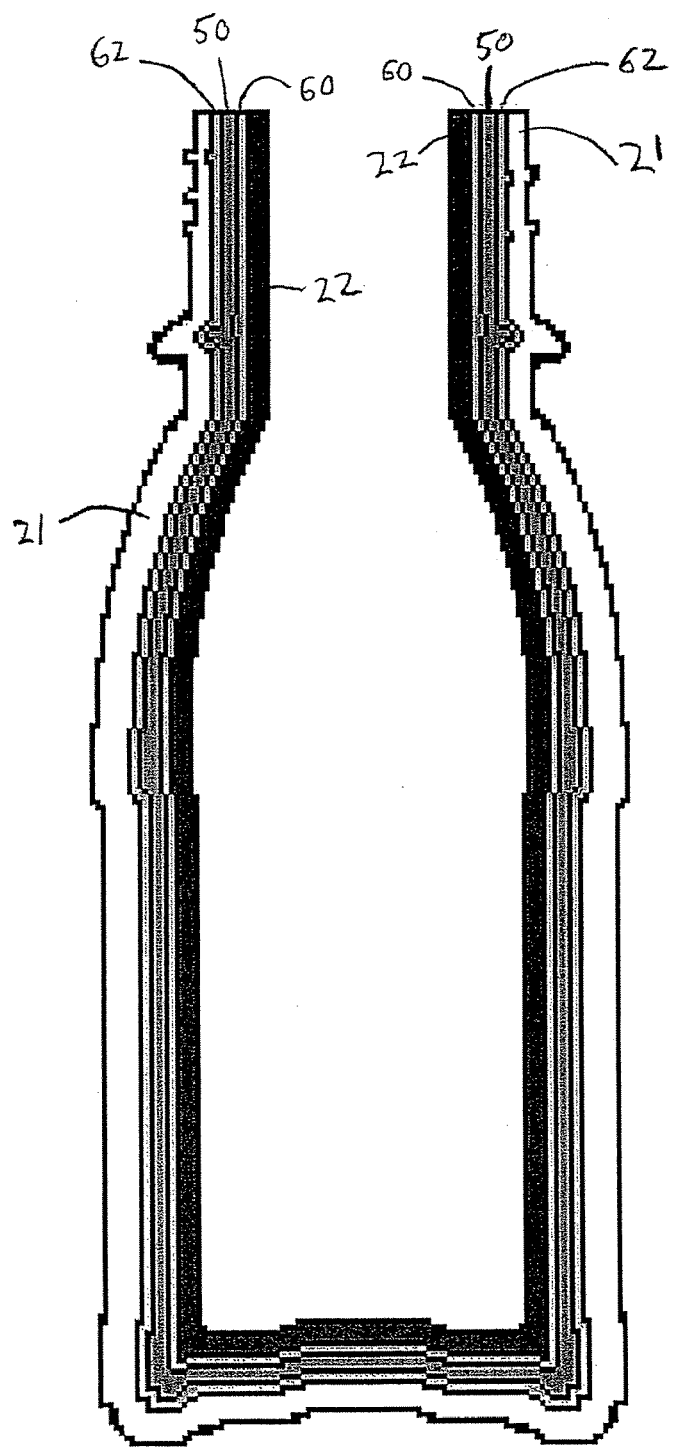
FIG. 9 is a vertical cross-section of a container according to another embodiment of the invention.

FIG. 9 illustrates a container comprising more than three layers to form the container. As shown in FIG. 6, an adhesive resin layer 60 can separate inner layer 22 and intermediate layer 50, and adhesive layer 62 can separate intermediate layer 50 and outer layer 21. Adhesive resin layers 60 and 62 can be made of any suitable resin that adheres to other resin layers. Examples of adhesive resins include but are not limited to Bynel® (by DuPont), Plexar® (by Equistar Chemical Company), and Admer® SF600 (by Mitsui Chemicals America, Inc.).

The desiccant employed may be any one that is able to withstand the handling, blending, co-extrusion and blow-molding steps without deterioration, and it can be such that it has a drying effect that is consistent with the maximum moisture content to be permitted within the interior volume 18 according to the product to be packaged, as well as a suitable long-term activity. The desiccant may be a so-called "physical" desiccant, e.g. a molecular sieve (zeolite) that binds water within its pore space, silica gel or clays having the ability to absorb water on their surfaces or within pore spaces of the material. An example of using a molecular sieve with calcium oxide is a blend of the following: 50% HDPE+50%

Blend: 75% CaO and 25% Molecular Sieve. While physical desiccants of this kind are useful, they can release moisture back into the internal volume 18 if exposed to heat and/or reduced pressure. So-called "chemical" desiccants (reactive materials) may therefore be more preferable as the absorption may not be reversible and the moisture level within the container may be maintained at an extremely low level. Examples of chemical desiccants are magnesium sulfate, barium oxide, and calcium oxide. Calcium oxide absorbs moisture according to the following equation:

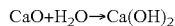

$$CaO + H_2O \rightarrow Ca(OH)_2$$

For practical purposes, the reaction is irreversible and the resulting $Ca(OH)_2$ is insensitive to heat and pressure. The CaO reactant is capable of absorbing water at all humidity levels and can continue to take up water until it is completely consumed.

In an embodiment, a chemical desiccant and a physical desiccant can be employed.

The desirable size of the desiccant particles is dependent on the actual desiccant employed. For example, when CaO is used, particles having a size of less than about 0.003 inches in diameter can be used. Larger desiccant particle sizes can create a grainy appearance. However, in certain embodiments, larger desiccant particles can be used.

Of course, the container need not be in the form of a bottle as shown in the drawings and may have any shape as required to accommodate a product to be packaged.

Layer 22 can be U.S. FDA and regulatory compliant for direct contact with food or drug products to be placed within open space defined by the container.

The invention is described in more detail with reference to the following Examples that are not intended to limit the scope of the present invention and are merely illustrative.

Example 1

A plastic bottle of the type shown in FIG. 1 was prepared by co-extrusion and blow-molding two resin layers as described above. The outer layer 21 was 30 mils in thickness and consisted of high density polyethylene (HDPE) sold under the trademark Exxon AD-60007. The inner layer 22 was 15 mils in thickness and consisted of a 50/50 by weight blend of the same high density polyethylene and a desiccant masterbatch. The masterbatch was a 50/50 by weight blend of calcium oxide (Ampacet™ grade 101499) and 21 melt index linear low density polyethylene. The inner layer 22 was 25% by weight calcium oxide.

The resulting bottle was subjected to tests to determine desiccant capacity, recovery from opening and projected product moisture gain, etc.

Figure 2:
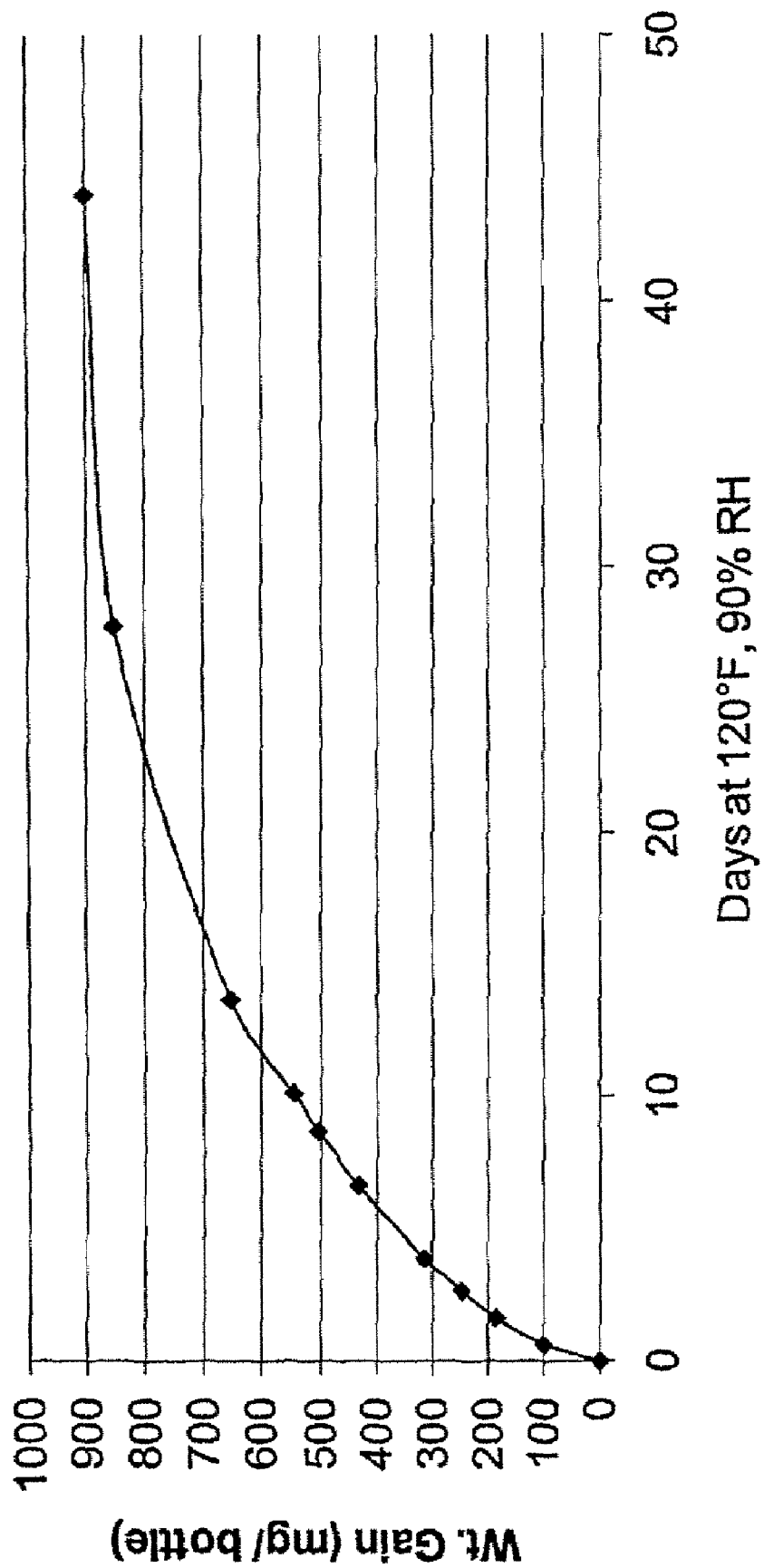
FIG. 2 is a graph illustrating weight gain versus time for a test carried out on one embodiment of a container of the kind shown in FIG. 1 at 90% relative humidity and at 120° F.

FIG. 2 is a graph illustrating weight gain versus time for a test carried out on a container of the kind shown in FIG. 1 at 90% relative humidity and at 120° F.

Figure 3:
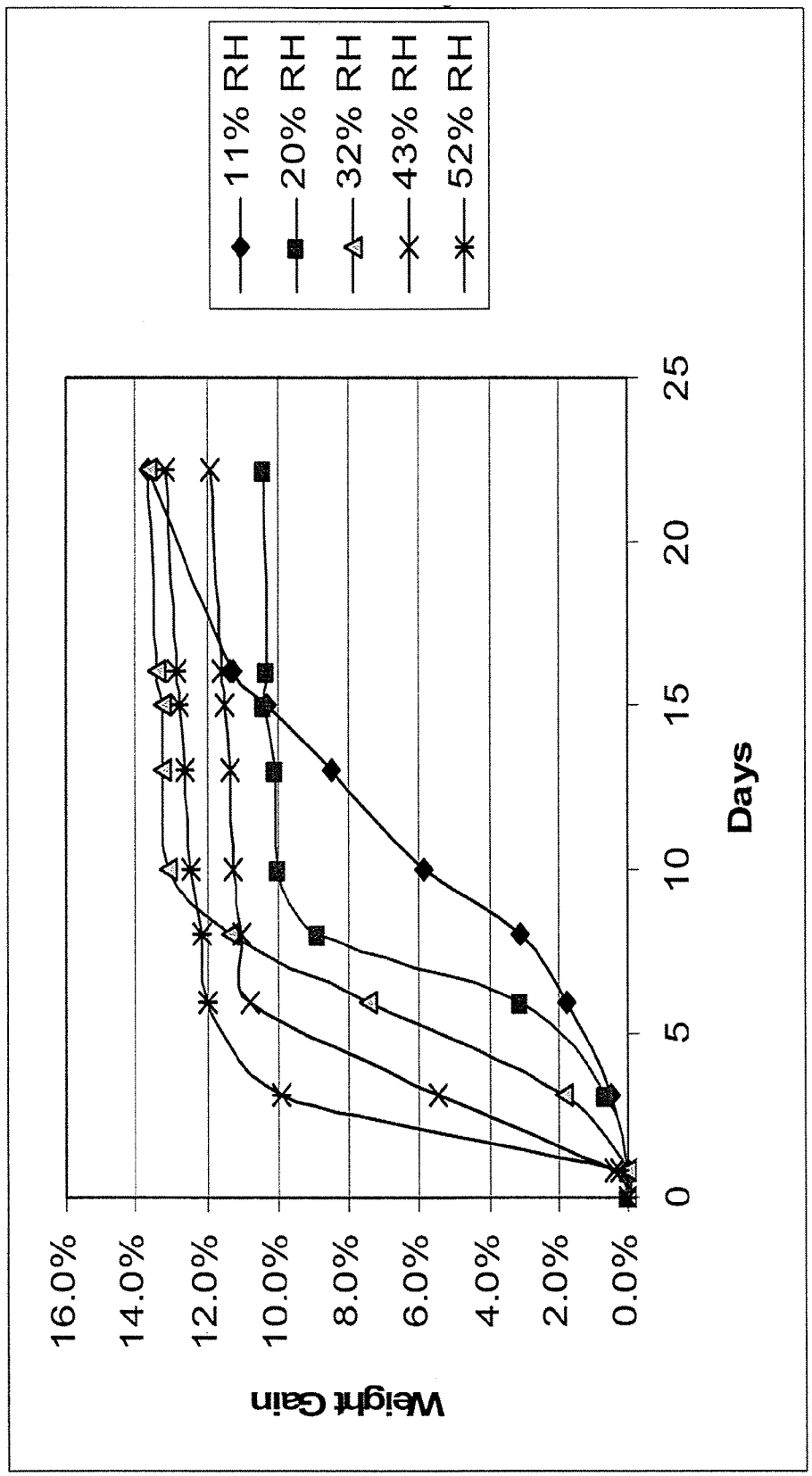
FIG. 3 is graph illustrating weight gain versus time at various relative humidities for a test carried out on one embodiment of a container of the kind shown in FIG. 1.

FIG. 3 is graph illustrating weight gain versus time at various relative humidity percentages (i.e., 11%, 20%, 32%, 43%, and 52%) for a container of the kind shown in FIG. 1.

Figure 4:
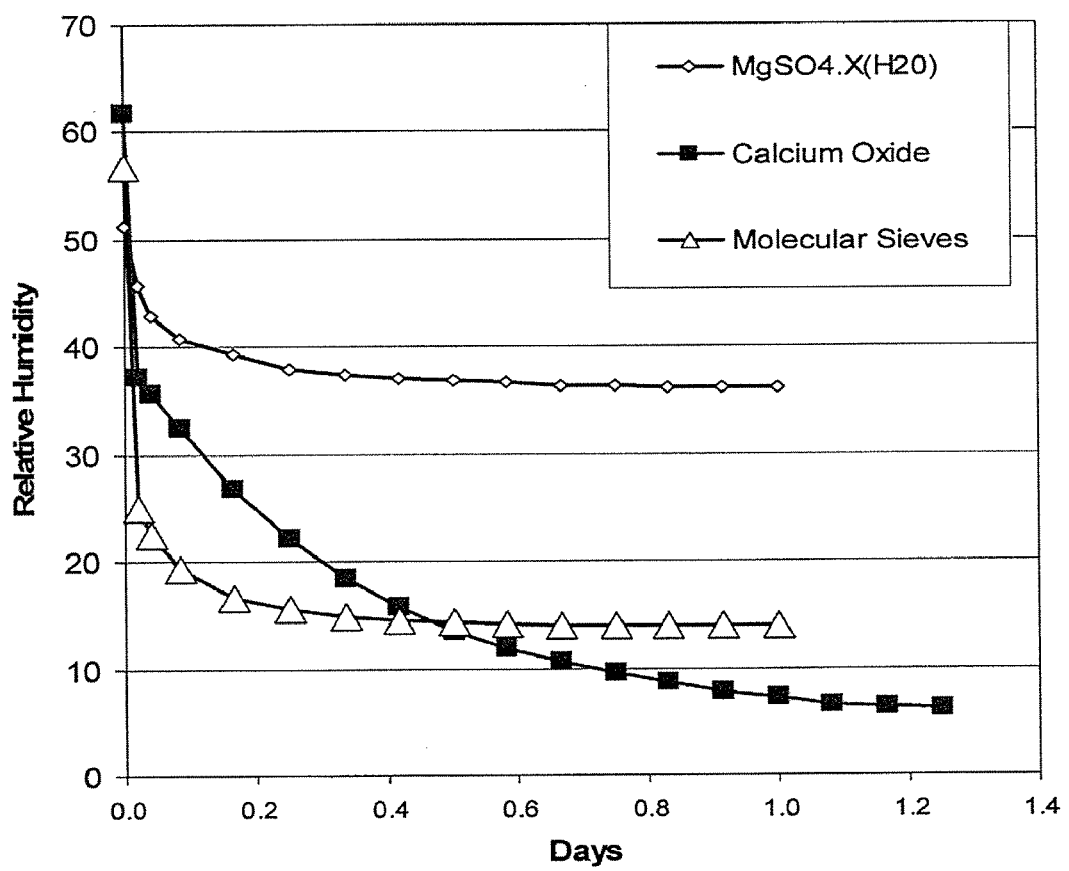
FIG. 4 is a graph illustrating the relative humidity control by various desiccants versus time.

FIG. 4 is a graph illustrating the relative humidity control by various desiccants (i.e., $MgSO_4 \cdot X(H_2O)$, Calcium Oxide (CaO), and a molecular sieve. A molecular sieve is a moisture scavenger and can be made of a variety of suitable materials.

A molecular sieve provides porous pathways and is a class of desiccant. The molecular sieve used this particular example was Ampacet 101787: 20% molecular sieve/80% carrier resin.

Figure 5:
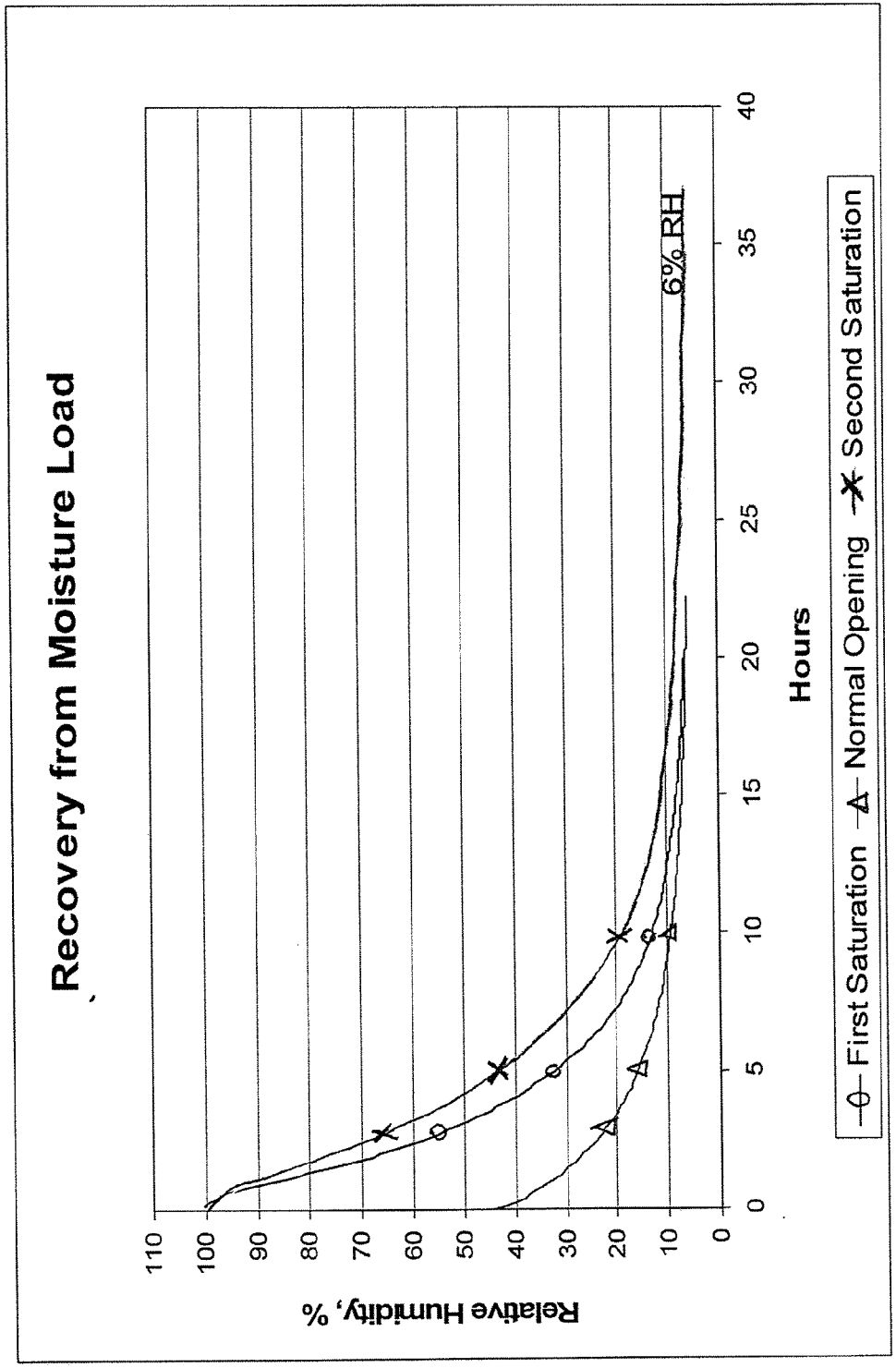
FIG. 5 is a graph illustrating relative humidity % versus time with respect to one embodiment of a container of the kind shown in FIG. 1.

FIG. 5 is a graph illustrating relative humidity % versus time for a test carried out on a container of the kind shown in FIG. 1 upon normal opening, first saturation, and second saturation, respectively.

FIG. 6 is a graph illustrating projected product moisture gain for a CaO desiccant container of the kind shown in FIG. 1.

Figure 7:
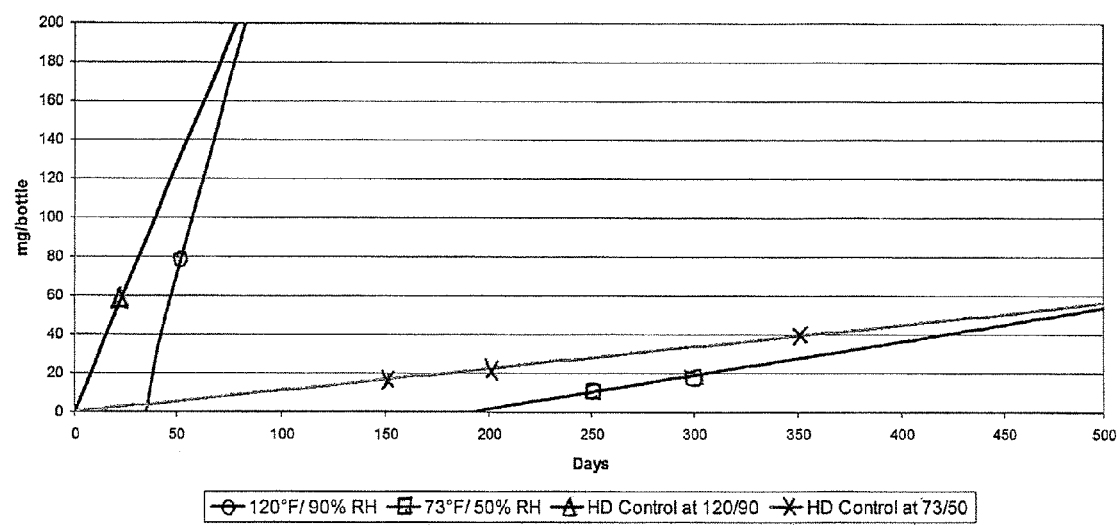
FIG. 7 is a graph illustrating projected product protection of a desiccant container of one embodiment of the kind shown in FIG. 1 compared to a HDPE container without desiccant.

FIG. 7 is a graph illustrating projected product protection provided by a desiccant container of the kind shown in FIG. 1 compared to a HDPE container without desiccant.

Below are the testing protocol used in Example 1.

1. Measure moisture sorption capacity of the bottle as total weight gain over time when exposed to the following relative humidity (RH) conditions

| | |
|---|---|
| Accelerated | 120° F., 90% RH |
| Ambient | Theoretical Model |

2. Measure impact of RH in headspace of bottle over time using data logger starting at 100° F. and 80% RH and 73° F. and 50% RH to determine lowest level of RH achieved.

3. Utilize control sample of Ampacet 101499 to determine available capacity of CaO in resin when started.

4. Determine via FTIR (i.e., Fourier Transformed Infrared Technique) the CaOH peak of bottle before, during and after the test to validate ability to measure CaO availability.

5. Use control sample of HDPE for determining MVTR barrier in comparison to the same thickness Moisture Scavenging bottle.

6. Use Desiccant model to determine anticipated moisture sorption capacity of the sample bottle to arrive at expected shelf stability at ambient and accelerated temperature and RH conditions of both control 100% HDPE and Desiccant bottle.

Example 2

A plastic bottle of the type shown in FIG. 1 was prepared by co-extrusion and blow-molding resin layers as described above. Four (4) multilayer structures were made, as identified below. In each structure, the HDPE resin was Chevron-Phillips Marlex 5502BN. Also, WX0226 (Plastic Color Chip PEC14828 white color concentrate used at 6 pounds per 100 pounds of Chevron Phillips Marlex 5502BN) was added to the outer layer in each variable structure.

In this example, a similar bottle to that of Example 1 was prepared, except that the desiccant masterbatch used in Example 1 was replaced by a masterbatch containing 20% by weight of a molecular sieve and 80% by weight of 21 melt index linear low density polyethylene. The molecular sieve was found to speed recovery but was consumed at a faster rate than CaO, that is, the molecular sieve reached its saturation point faster than CaO.

Wall thickness approximately 50 mils.

Molding Process: Co-extrusion Blow Molding: 3 Extruders, 8 station Lab Wheel; 2 cavities, 6 stations blanked off Materials:

HDPE: Chevron Phillips Marlex HHM 5502BN HDPE (0.35 melt index, 0.955 HDPE hexene copolymer)

Color: WX0226: 6 lbs. PCC 14828 52% $TiO_2$+3.9% Zinc Stearate+44.1% PE=2.9% $TiO_2$ & 0.22% Zinc Stearate in molded layer Desiccant: Ampacet 101499: 50% CaO/50% PE carrier resin Molecular Sieve: Ampacet 101787: 20% Molecular Sieve/80% carrier resin Foaming Conc.: Ampacet 703061-H: 50% Sodium Carbonate Acid Foaming agent/50% carrier resin Variant 1 (Control): "Monolayer" HDPE
- A Outside Surface 15 mils Chevron Phillips Marlex HHM 5502BN HDPE+WX0226 White
- B Sandwiched Layer 15 mils Chevron Phillips Marlex HHM 5502BN HDPE
- C Product Contact Layer 20 mils Chevron Phillips Marlex HHM 5502BN HDPE Variant 2: HDPE with Desiccant Layer, 35% CaO in Layer C
- A Outside Surface 15 mils Chevron Phillips Marlex HHM 5502BN HDPE+WX0226 White
- B Sandwiched Layer 15 mils Chevron Phillips Marlex HHM 5502BN
- C Product Contact Layer 20 mils 30% Chevron Phillips Marlex HHM 5502BN HDPE+70% Ampacet 101499 CaO conc.

Variant 3: HDPE/Desiccant Layer/Desiccant+Molecular Sieve Layer, 35% CaO in Layer B, 22.5% CaO & 5% Molec. Sieve in Layer C
- A Outside Surface 30 mils Chevron Phillips Marlex HHM 5502BN HDPE+WX0226 White
- B Sandwiched Layer 20 mils 30% Chevron Phillips Marlex HHM 5502BN HDPE+70% Ampacet 101499 CaO conc.
- C Product Contact Layer 5 mils 30% Chevron Phillips Marlex HHM 5502BN HDPE+45% Ampacet 101499 CaO conc.+25% Ampacet 101787

Variant 4: HDPE/Desiccant Layer/Foamed Desiccant Layer, 35% CaO Loading in Layer B, 34% CaO in Layer C
- A Outside Surface 30 mils Chevron Phillips Marlex HHM 5502BN HDPE+WX0226 White
- B Sandwiched Layer 10 mils 30% Chevron Phillips Marlex HHM 5502BN HDPE+70% Ampacet 101499 CaO conc.
- C Product Contact Layer 10 mils 30% Chevron Phillips Marlex HHM 5502BN HDPE+68% Ampacet 101499 CaO conc.+2% Ampacet 703061-H foaming conc.

Test Method and Conditions:

1. Measure moisture sorption capacity of the bottle as total weight gain over time when exposed to the following Relative Humidity (RH) conditions: Accelerated 120° F., 90% RH; Ambient Theoretical Model 73° F., 50% RH.]

2. Measure impact of RH in headspace of bottle over time using data logger starting at 100° F. & 80% RH and 73° F. & 50% RH to determine lowest level of RH achieved.

3. Utilize control sample of Ampacet 101499 to determine available capacity of CaO in resin when started.

4. Determine via FTIR the CaOH peak of bottle before, during and after the test to validate ability to measure CaO availability.

5. Use control sample of HDPE for determining MVTR barrier in comparison to the same thickness Moisture Scavenging bottle.

6. Use Desiccant model to determine anticipated moisture sorption capacity of the sample bottle to arrive at expected shelf stability at ambient and accelerated temperature and RH conditions of both control 100% HDPE and Desiccant bottle.

Figure 10:
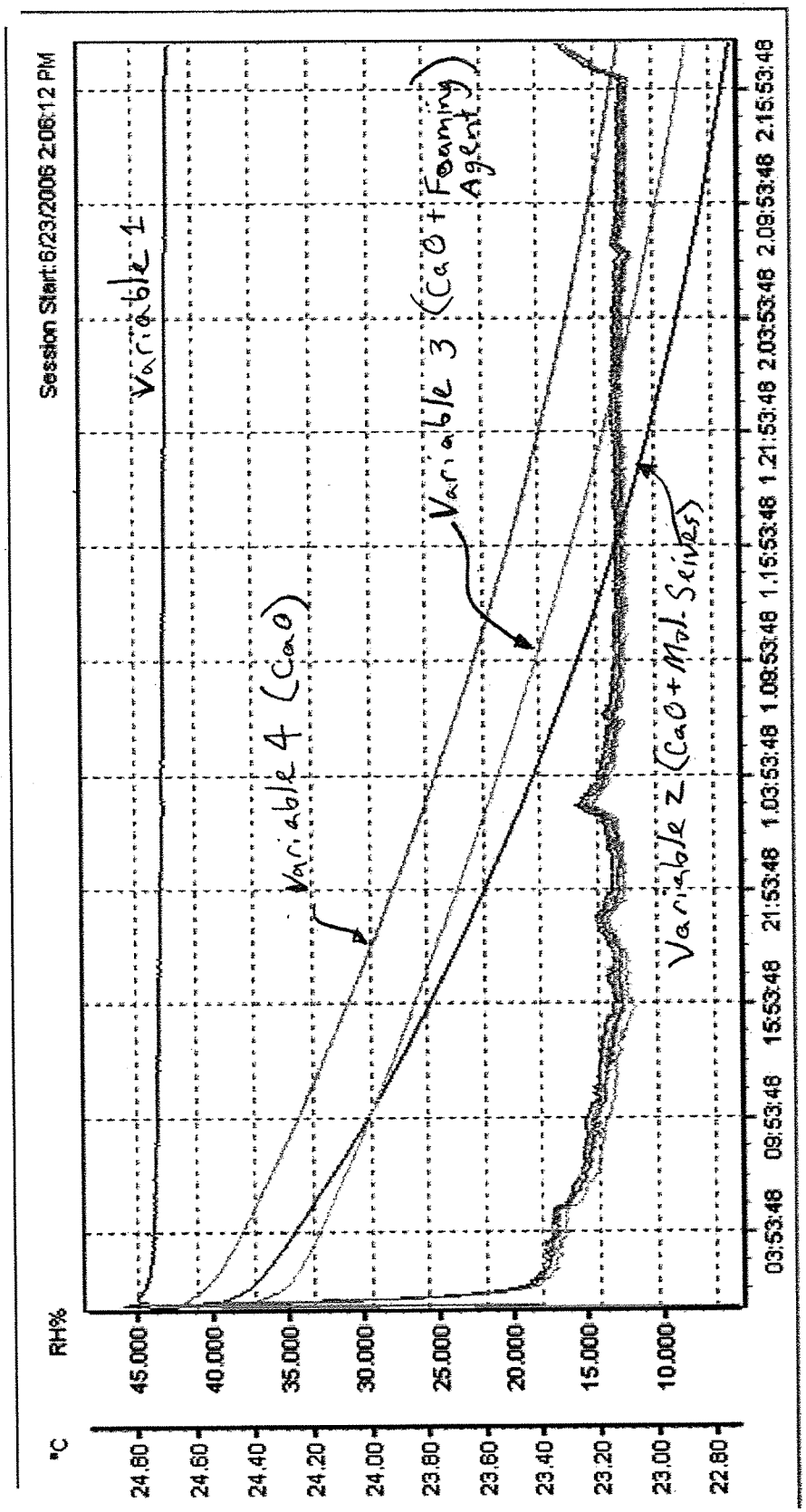
FIG. 10 illustrates the recovery from 50% relative humidity at 73° F. (23° C.) for particular containers in accordance with the invention as compared to a control container.

The resulting bottles were subjected to tests to determine recovery from 50% relative humidity at 73° F. (23° C.). The results for Variable Structures 1, 2, 3, and 4 are shown in FIG. 10. Variations in bottle wall thickness or seals may have a bearing on the minimum RH obtained. Also, variations in sensor calibrations may lead to small differences.

Figure 11:
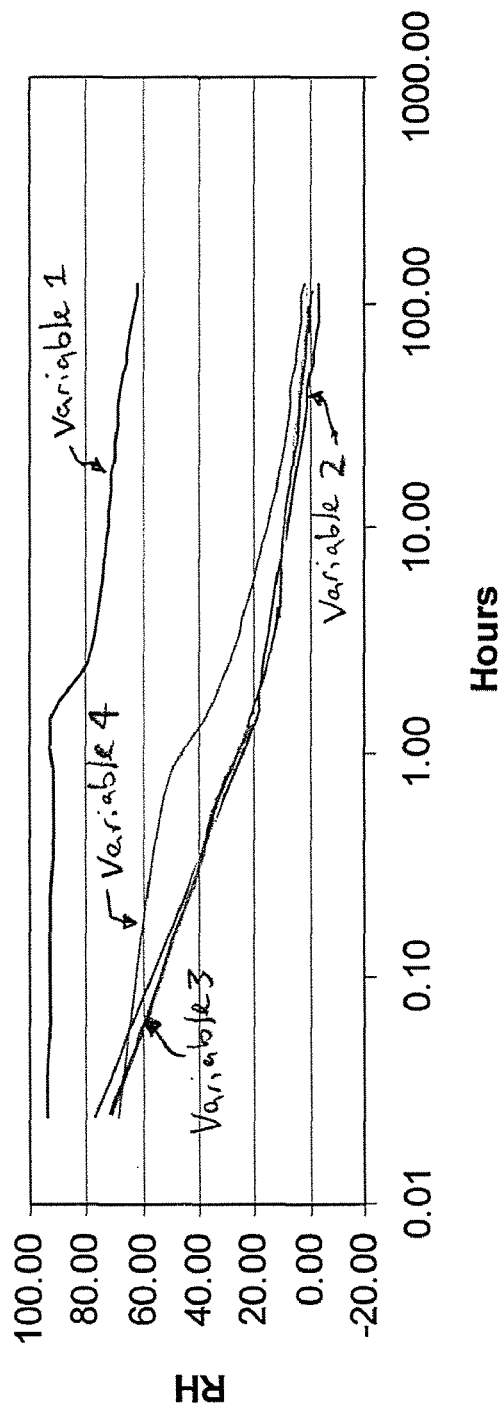
FIG. 11 illustrates recovery speed from High RH Exposure in 50% RH for particular containers in accordance with the invention as compared to a control container.

FIG. 11 illustrates recovery speed from High RH Exposure in 50% RH for particular containers in accordance with the invention as compared to a control container.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

We claim:

1. A container formed by a blow molding process defining an interior volume for holding a moisture-sensitive product, and comprising a neck and a side wall, the neck having a first cross sectional area, and the side wall having a second cross sectional area, the first cross sectional area being smaller than the second cross sectional area, the neck and the side wall sharing at least an inner layer and an outer layer, the inner and outer layers each having a thickness of at least 20 mils and each being formed by the blow molding process selected from a group consisting of coextrusion blow molding, coinjection blow molding and coinjection stretch blow molding, the inner layer comprising a polymeric material and between 25 weight percent and 80 weight percent of a desiccant material, the outer layer comprising a moisture-barrier material, wherein the container retains its molded shape under gravity, wherein the polymeric material of the inner layer and the moisture-barrier material of the outer layer both comprise high density polyethylene.

2. A container according to claim 1, wherein the inner layer has a porous structure.

3. A container according to claim 1, wherein the outer layer has a non-porous structure.

4. A container according to claim 1, wherein the desiccant material is a chemical desiccant.

5. A container according to claim 1, wherein the desiccant material is physical desiccant.

6. A container according to claim 1, wherein the inner layer comprises 50 weight percent desiccant material.

7. A container according to claim 4, wherein said chemical desiccant is calcium oxide.

8. A container according to claim 1, wherein the inner layer is formed using a blowing agent.

9. A container according to claim 1, wherein the inner layer has a thickness of at least about 73 mils.

10. A container according to claim 1, wherein the inner layer comprises a blend of a molecular sieve and calcium oxide.

11. A container according to claim 1, wherein a ratio of desiccant to polymeric material in the inner layer is approximately 80 parts by weight of desiccant to 20 parts by weight polymeric material.

12. A container according to claim 1, further comprising an intermediate layer positioned between the inner layer and the outer layer, and further comprising an adhesive resin layer adhering one of the inner layer and the outer layer to the intermediate layer, the intermediate layer comprising a material having a higher moisture resistance than the moisture-barrier material in the outer layer.

13. A container defining an interior volume for holding a moisture-sensitive product, and comprising at least an inner layer and an outer layer, the inner and outer layers each having a thickness of at least 20 mils and being formed by a molding process selected from the group consisting of coextrusion blow molding, coinjection blow molding and coinjection stretch blow molding, the inner layer comprising a polymeric material and between 25 weight percent and 80 weight percent of a desiccant material, the outer layer comprising a moisture-barrier material; wherein the container retains its molded shape under gravity, further comprising an intermediate layer positioned between the inner layer and the outer layer, and further comprising an adhesive resin layer adhering one of the inner layer and the outer layer to the intermediate layer, the intermediate layer comprising a material having a higher moisture resistance than the moisture-barrier material in the outer layer, wherein the polymeric material of the inner layer and the moisture-barrier material of the outer layer both comprise high density polyethylene.

14. A container and closure combination comprising a rigid container and a closure, the rigid container formed by a blow molding process, defining an interior volume for holding a moisture-sensitive product and defining an opening adjacent the interior volume, the rigid container comprising at least an inner layer and an outer layer that are each formed by the blow molding process, the inner and outer layers each having a thickness of at least 20 mils and being coextruded layers, the inner layer comprising a polymeric material and between 25 weight percent and 80 weight percent of a desiccant material comprising calcium oxide, the outer layer comprising a moisture-barrier material, the closure adapted to close the opening, wherein the inner and outer layers of the container are each disposed at a neck and a side wall of the container, and wherein first cross-sectional area defined by the neck of the container is smaller than a second cross-sectional area defined by the side wall of the container, wherein the polymeric material of the inner layer and the moisture-barrier material of the outer layer both comprise high density polyethylene.

15. A container and closure combination according to claim 14, wherein the ratio of desiccant to polymeric material in the inner layer is in the range of approximately 50 parts by weight of desiccant to 50 parts by weight polymeric material, to 80 parts by weight of desiccant to 20 parts by weight polymeric material.

16. A container and closure combination according to claim 15, wherein the ratio of desiccant to polymeric material is approximately 50:50 by weight.

17. A container formed by a blow molding process, the container defining an interior volume for holding a moisture-sensitive product, and comprising at least an inner layer and an outer layer each formed by the blow molding process, the inner and outer layers being coextruded layers, the inner layer having a thickness of at least about 20 mils and comprising a polymeric material comprising a desiccant material, the outer layer comprising a moisture-barrier material, wherein the ratio of desiccant to polymeric material in the inner layer is in the range of approximately 25 parts by weight of desiccant to 75 parts by weight polymeric material, to 80 parts by weight of desiccant to 20 parts by weight polymeric material, wherein the container retains its molded shape under gravity, and wherein the inner and outer layers of the container are each disposed at neck and a side wall of the container, and wherein a first cross-sectional area defined by the neck of the container is smaller than a second cross-sectional area defined by the side wall of the container, wherein the polymeric material of the inner layer and the moisture-barrier material of the outer layer both comprise high density polyethylene.

18. A container according to claim 17, wherein the ratio of desiccant to polymeric material is approximately 50:50 by weight.

* * * * *